United States Patent
Beer et al.

(10) Patent No.: US 10,965,014 B2
(45) Date of Patent: Mar. 30, 2021

(54) RADAR UNIT WITH THERMAL TRANSFER VIA RADOME

(71) Applicant: Aptiv Technologies Limited, St. Michael (BB)

(72) Inventors: Robert C. Beer, Noblesville, IN (US); Matthew S. Carrell, Kokomo, IN (US); Ryan K. Rossiter, Kokomo, IN (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 51 days.

(21) Appl. No.: 16/399,059

(22) Filed: Apr. 30, 2019

(65) Prior Publication Data

US 2020/0350670 A1    Nov. 5, 2020

(51) Int. Cl.
  *H01Q 1/42*    (2006.01)
  *G01S 13/86*   (2006.01)
  *H01Q 1/24*    (2006.01)
(52) U.S. Cl.
  CPC .............. *H01Q 1/42* (2013.01); *G01S 13/86* (2013.01); *H01Q 1/24* (2013.01)
(58) Field of Classification Search
  None
  See application file for complete search history.

(56) References Cited

U.S. PATENT DOCUMENTS

| 5,828,339 A | 10/1998 | Patel |
| 2016/0064807 A1* | 3/2016 | Reed ................. H01Q 1/38 343/713 |
| 2016/0268694 A1 | 9/2016 | Ma et al. |
| 2017/0373387 A1 | 12/2017 | Ohlsson et al. |

FOREIGN PATENT DOCUMENTS

| DE | 102016119274 A1 | 4/2018 |
| EP | 2538106 A2 | 12/2012 |
| EP | 3070784 A1 | 9/2016 |
| WO | 2010018934 A2 | 2/2010 |

OTHER PUBLICATIONS

European Search Report for European Application No. 20167124.5 dated Sep. 17, 2020.

* cited by examiner

*Primary Examiner* — Jany Richardson
(74) *Attorney, Agent, or Firm* — Carlson, Gaskey & Olds, P.C.

(57) ABSTRACT

A radar unit includes a printed circuit board (PCB) supporting an integrated circuit (IC) chip. A radome is arranged over the IC chip. A spring engages the IC chip and the radome. The spring is configured to transfer thermal energy between the IC chip and the radome.

21 Claims, 7 Drawing Sheets

RADAR UNIT WITH THERMAL TRANSFER VIA RADOME

FIELD OF INVENTION

The disclosure relates to radar unit with a radome and one or more integrated circuit (IC) chips.

BACKGROUND

Radar units are increasing used in vehicle and other applications to determine the location and proximity of objects to the vehicle. One typical radar unit includes one or more circuit boards arranged in a housing that has a radome. One or more IC chips are provided on the circuit board that is adjacent to the radome. The chips send waves through the radome and receive the waves reflected off of objects to determine the location and proximity of the objects to the chip, and thus, the vehicle.

The development of one type of radar unit, such as an automotive long-range radar product, has resulted in the placement of radar monolithic microwave integrated circuits (MMIC) on a side the circuit board facing the radome. MMICs may generate a significant amount of heat, which must be transferred to the surrounding environment to ensure desired operation of the radar unit's electronics.

SUMMARY

In one exemplary embodiment, a radar unit includes a printed circuit board (PCB) supporting an integrated circuit (IC) chip. A radome is arranged over the IC chip. A spring engages the IC chip and the radome. The spring is configured to transfer thermal energy between the IC chip and the radome.

In a further embodiment of the above, the IC chip is a monolithic microwave integrated circuit (MMIC).

In a further embodiment of any of the above, the radome is constructed from a plastic material. The spring is constructed from a corrugated metallic material having flexible undulations.

In a further embodiment of any of the above, the radome includes a metallic heat transfer bar. The spring engages the heat transfer bar.

In a further embodiment of any of the above, the heat transfer bar is provided by a metallic plating that is deposited onto the plastic material.

In a further embodiment of any of the above, the radome includes a slot that receives the heat transfer bar.

In a further embodiment of any of the above, the heat transfer bar includes a notch. The spring has a tab that is received in the slot and within the notch.

In a further embodiment of any of the above, an electromagnetic interference (EMI) shield is mounted to the PCB about the IC chip. The spring engages the EMI shield.

In a further embodiment of any of the above, the radar unit includes a plastic housing arranged about the PCB. The radome is provided by the plastic housing.

In a further embodiment of any of the above, the housing includes cooling fins.

In a further embodiment of any of the above, the radar unit includes a metallic housing arranged about the PCB. The housing includes an aperture. The radome is overmolded within the aperture.

In a further embodiment of any of the above, the PCB includes a row of IC chips. A common spring engages each of the IC chips within the row.

In another exemplary embodiment, a method of manufacturing a radar unit includes the steps of securing a printed circuit board (PCB) that has an integrated circuit (IC) chip to a housing portion, mounting a spring to a radome, and securing the radome relative to the housing portion to engage the IC chip with the spring.

In a further embodiment of any of the above, the radome includes a heat transfer bar. The mounting step includes engaging the spring with the heat transfer bar.

In a further embodiment of any of the above, the method includes the step of depositing the heat transfer bar onto a radome substrate.

In a further embodiment of any of the above, the method includes the step of inserting the heat transfer bar into a slot in a radome substrate.

In a further embodiment of any of the above, the method includes the step of inserting a tab of the spring into a notch in the heat transfer bar.

A radar unit includes a radar generating unit for emitting microwaves. A radome is arranged over the radar generating unit. The radar unit further includes a heat transfer stack for transferring thermal energy between the radar generating unit and the radome. The heat transfer stack engages the radome and the radar generating unit.

In a further embodiment of any of the above, the radar generating unit is a monolithic microwave integrated circuit (MMIC). The radome is constructed from a plastic material. The heat transfer stack is a spring constructed from a corrugated metallic material.

In a further embodiment of any of the above, the radar unit includes a shielding device for minimizing electromagnetic interference with the radar generating unit. The heat transfer stack engages the shielding device.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible. Like reference numbers and designations in the various drawings indicate like elements.

DETAILED DESCRIPTION

Figure 1:
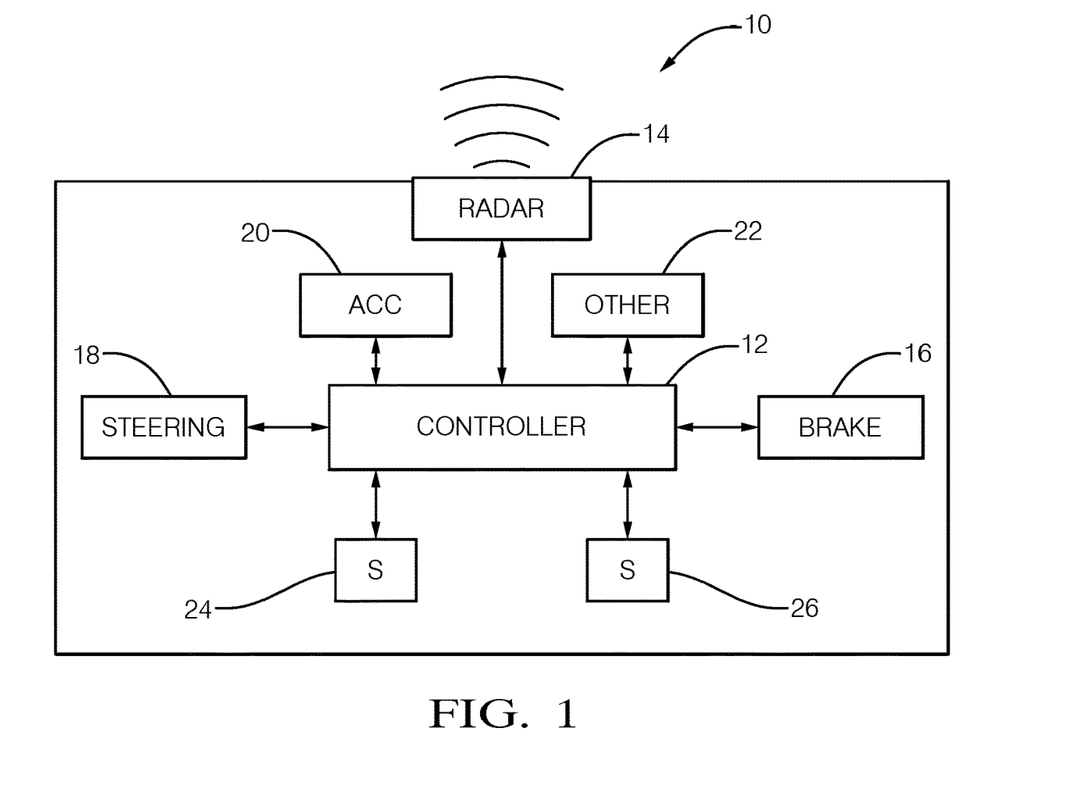
FIG. 1 is simplified schematic view of one type of vehicle radar system.

An example vehicle radar system 10 is schematically illustrated in FIG. 1. The system 10 includes a controller 12 in communication with a variety of components that provide driver assist features. In one example, a radar unit 14, such as an automotive long-range radar (e.g., 77 GHz) is in communication with a controller; however, it should be understood that other types of radar units (e.g., 24 GHz short range radar) may incorporate the disclosed heat transfer scheme. One or more other sensors 24, 26, such as LIDAR, GPS, ultrasonic sensors, and/or video cameras, may also be in communication with the controller 12.

The various sensors cooperate to aid the driver in operating the vehicle, such as providing brake assist 16, steering assist 18, and automated cruise control 20. Various other assist or control systems 22 may be provided in the vehicle 10 to provide improved vehicle safety.

Figure 2:
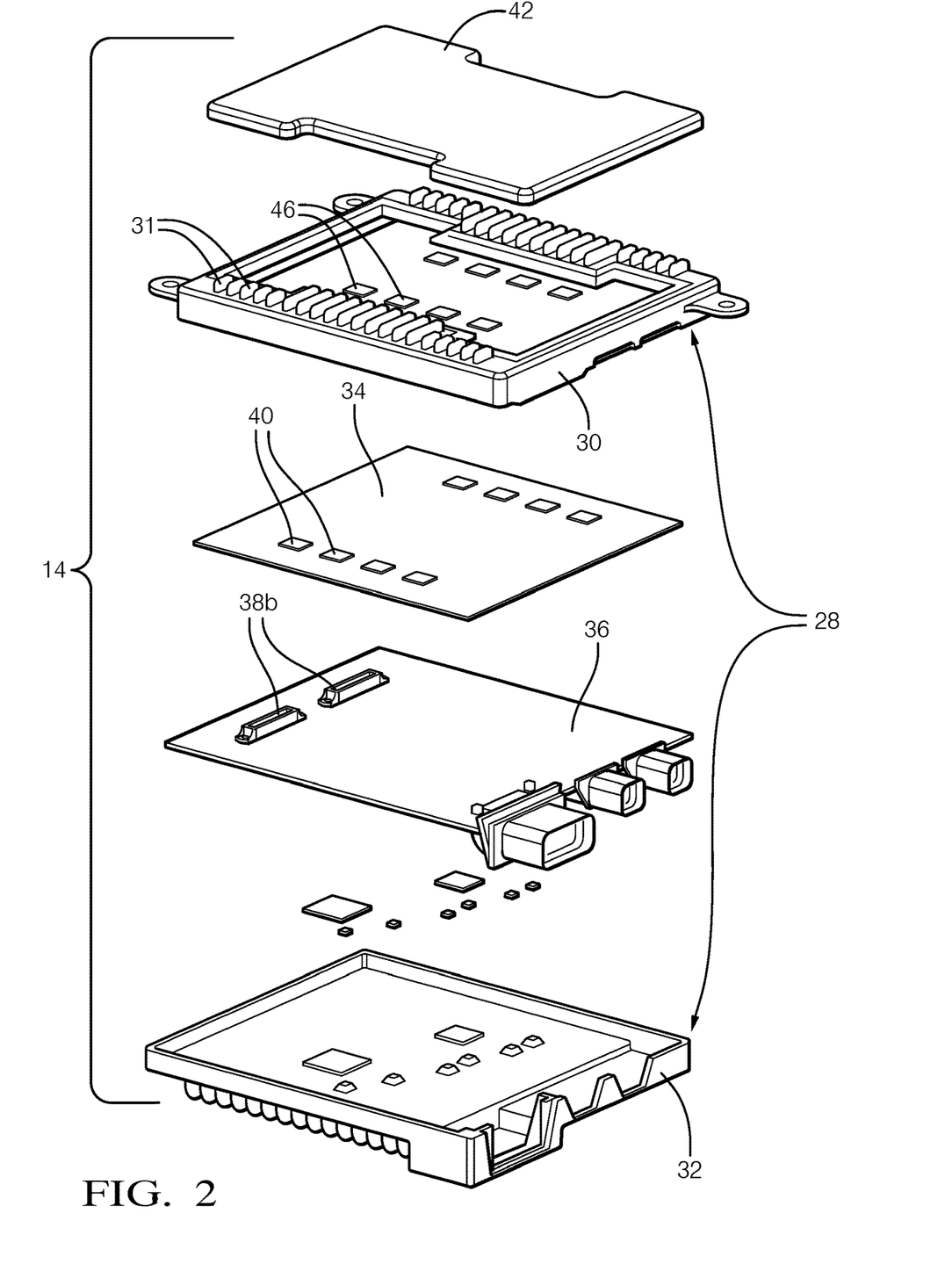
FIG. 2 is an exploded view of one example radar unit.

An example radar unit 14 is illustrated in FIG. 2. The radar unit 14 includes a multi-piece housing 28 comprising at least first and second housing portions 30, 32. Typically, multiple printed circuit boards (PCBs) such as first and second PCBs 34, 36 are packaged within the housing 28. The PCBs 34, 36 may be electrically interconnected with one another using a connector provided by first and second connector portions 38a, 38b, for example, that interlock with one another when assembled. Other configurations than those disclosed may also be used.

As radar units evolve and become more powerful and complex, a significant amount of heat is generated within the radar unit that must managed. In one example type of radar unit, multiple (e.g., eight) integrated circuit chips (IC chips 40), such as monolithic microwave integrated circuits (MMICs), are used to generate microwaves that sense surrounding objects in relation to the vehicle 10. The wave-generating and receiving IC chips 40, such as the MMICs, are arranged on an outer face of the PCB 34.

The housing 28 includes a radome 42 arranged over the IC chips 40. The radome 42 is constructed of a plastic material, such as polybutylene terephthalate (PBT), which enables the waves from the IC chips 40 to easily pass through the radome 42. In the example shown in FIGS. 2 and 5, the first housing portion 30 includes an aperture that is sealed by the radome 42, such that the radome 42 and the first housing portion 30 may be constructed of different materials. In the example shown in FIG. 4B, the first housing portion 30 may be constructed of the same plastic as the radome 42 such they are a seamless, unitary structure. Such a plastic radome is typically not a very good thermal conductor.

Figure 3:
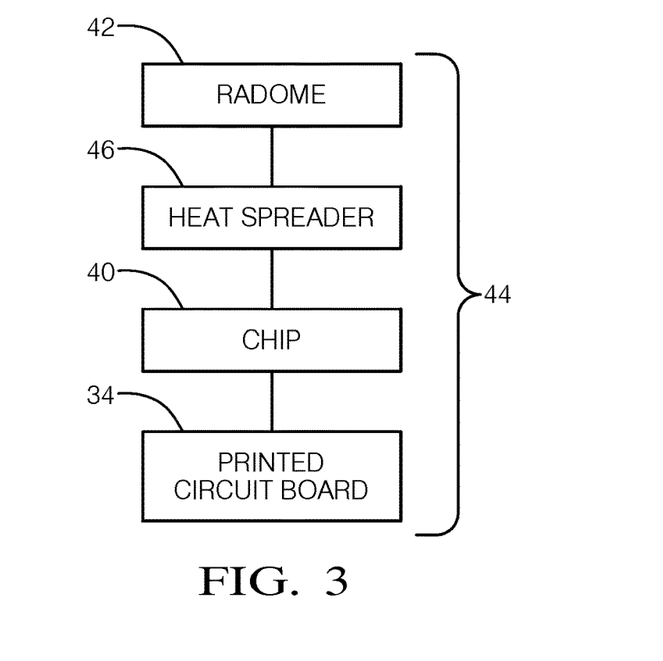
FIG. 3 is a schematic of a heat transfer stack of the radar unit used for transferring heat from an integrated circuit (IC) chip to a radome.

The MMICs generate a significant amount of heat during operation. A heat transfer stack 44 is employed, as schematically illustrated in FIG. 3, to transfer heat from the IC chips 40 to the radome 42. One typical PBT material used for the radome 42 has a relatively low thermal conductivity, for example, approximately 270 W/m-K. Nonetheless, this low thermal conductively is much more thermally conductive than air (by approximately 10 times). While heat transfer across the radome 42 will not remove all of the MMIC-generated heat, taking advantage of this thermal feature can significantly improve overall sensor thermal performance, particularly if a heat transfer stack is used to provide conduction between the IC chip 40 and the radome 42, as shown in FIG. 3. As an example, a 108 mm$^2$ area of a PBT radome 42 can transfer approximately 0.58 Watts with a 40° C. temperature differential across the radome 42.

The problem of heat sinking the MMICs through the front face of the radar unit 14, i.e., the radome 42, is solved by introducing a heat spreader 46 to spread and conduct the heat through the radome 42, as shown in FIG. 3. One or more IC chips 40 mounted on the printed circuit board 34 are in engagement with a heat spreader 46, which also firmly engages the radome 42. In this manner, the heat spreader 46, which may comprise one or more discrete components, conductively transfers heat from the IC chip 40 to the radome 42.

Figure 4:
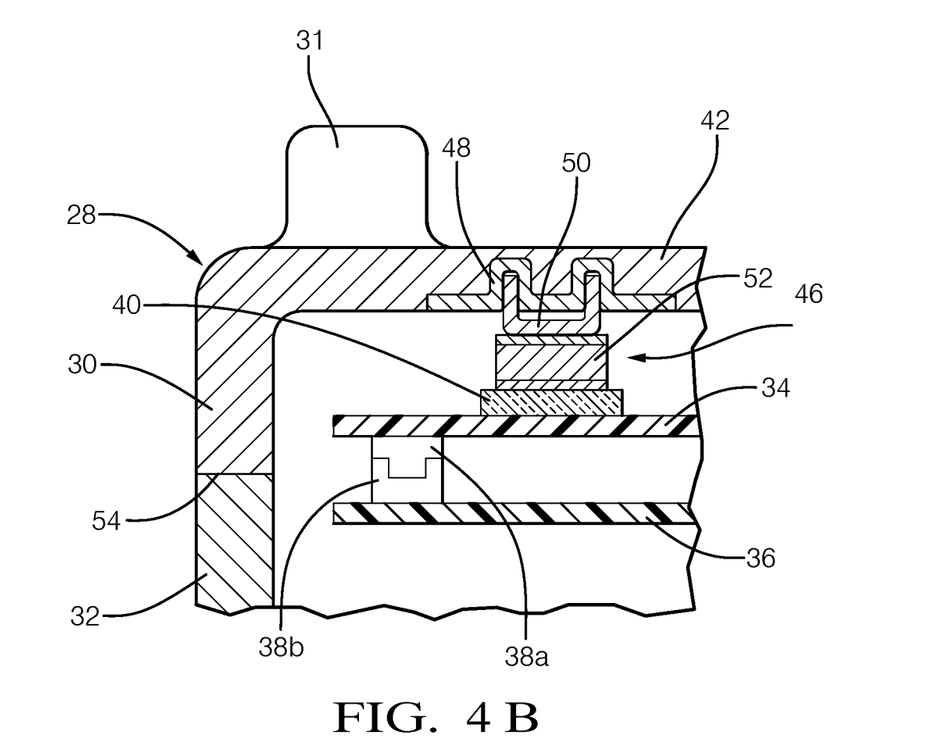
FIG. 4A is a perspective view of one example heat transfer stack that includes a heat spreader, a heat sink and a spring.
FIG. 4B is a schematic partial cross-sectional view of the heat transfer stack shown in FIG. 4A arranged in a radar unit housing.
Figure 4A:
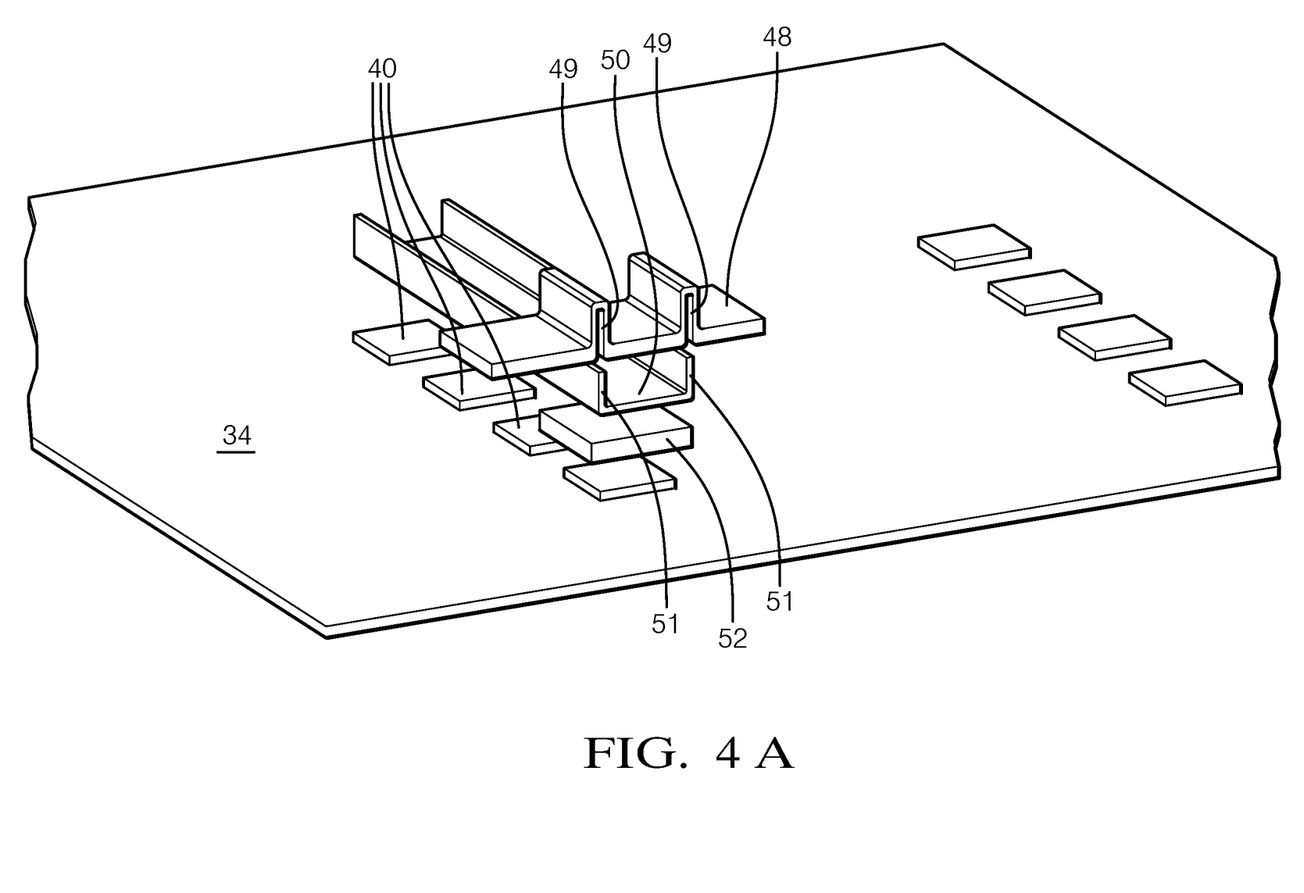

Referring to FIGS. 4A-4B, an example heat transfer stack is illustrated. In one example, the radome 42 is provided by the first housing portion 30. Additional surface area features could be incorporated on the outer, front face of the radome 42 to increase overall heat transfer to the ambient air. For example, the first housing portion 30 is a molded plastic material, which may include multiple fins 31 to assist in dissipation of heat from the radome 42. The first and second housing portions 30, 32 may be secured to one another at a joint 54 by laser welding, for example.

In one embodiment, these single or multiple stamped metallic conductive heat spreaders incorporate contact springs, described below, that provide one or more points of thermal contact to the front face of each MMIC while maintaining multiple points of contact to the interior face of the radome 42. These spring contacts allow for the heat spreading away from the heat generating face of the MMIC while transferring heat through the plastic radome 42. The springs also provide for vertical assembly tolerance to assure constant contact between the MMIC and the radome 42.

The radome 42 includes a heat sink 48 embedded into an interior surface of the radome 42 facing the IC chips 40. The heat sink 48 includes a slot 49 that receives legs 51 of a heat transfer bar 50. One or more thin, flexible springs 52 physically contact and engage the IC chips 40 and the heat transfer bar 50. The heat sink 48, the heat transfer bar 50, and the spring 52 are a highly thermally conductive material such as a metal, for example, copper, magnesium or aluminum.

The spring 52 may be secured to the heat transfer bar 50 to simplify final assembly of the radar unit 14. Attachments such as solder, braze, adhesive, rivets, fasteners, or other attaching mechanisms may be used to secure the spring 52 to the heat transfer bar 50. The heat transfer bar 50 with its attached springs 52 may then be inserted in the slots 49 of the heat sink 48, which provides a unitary assembly with the first housing portion 30. Alternatively, the springs 52 may be integrated into the heat transfer bar 50 as a single, unitary structure without any separate attachments.

Figure 5:
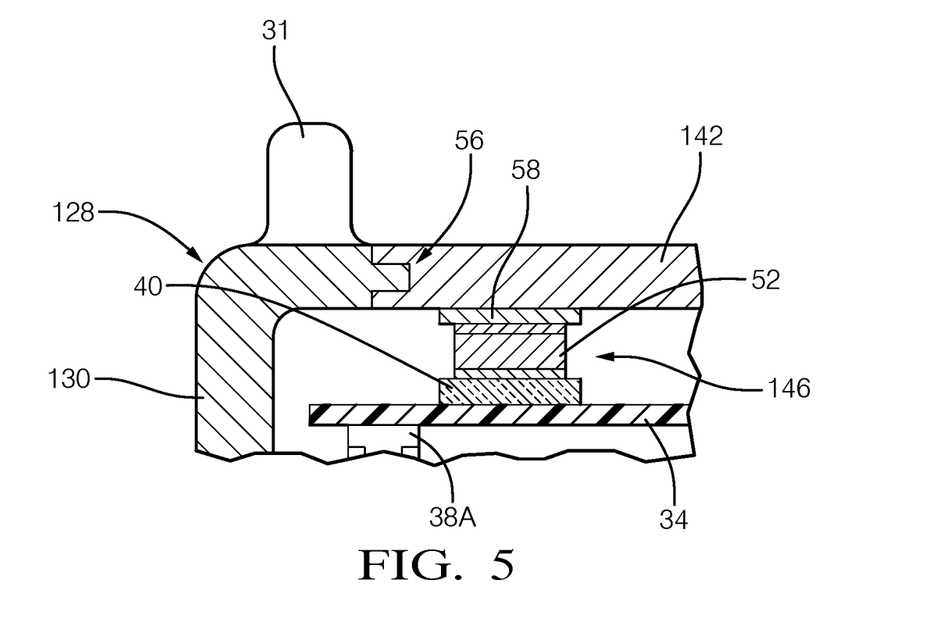
FIG. 5 is a schematic partial cross-sectional view of another example heat transfer stack arranged in another radar unit housing.
Figure 13:
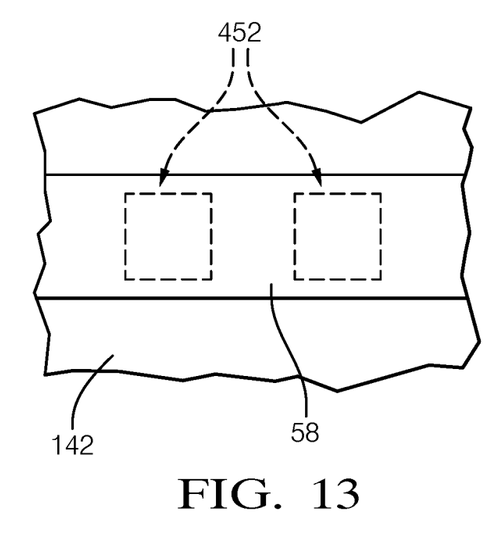
FIG. 13 is an elevation view of a plating deposited onto the radome and configured to engage a spring.

In another example, as shown in FIGS. 5 and 13, the heat transfer bar 58 may be adhered directly to the inner surface of the radome 142, for example, by plating the heat transfer bar 58 directly onto the radome 142 using a suitable metal deposition technique. The area of engagement of the springs 452 with the heat transfer bar 58 is illustrated by dashed lines in FIG. 13.

As shown in FIG. 5, the radome 142 may be provided by a plastic material, while the first housing portion 130 may be provided by another material, such as a different plastic material or metal for improved heat transfer. An interlocking profile 56 may be provided between the radome 142 and the first housing portion 130, for example, by over-molding the radome 42 within the aperture provided by the first housing portion 130.

Figure 6:
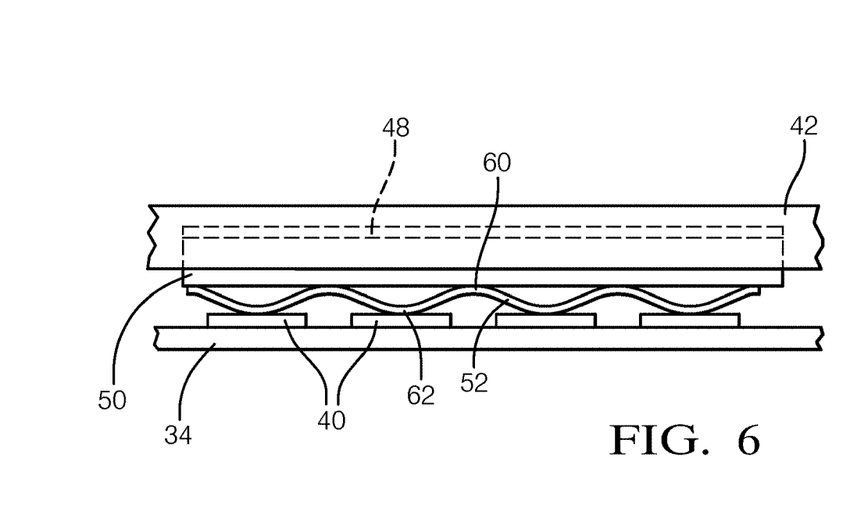
FIG. 6 is a side view of the heat transfer stack shown in FIG. 4B.

Referring to FIG. 6, the spring 52 includes flexible first and second undulations 60, 62. The first undulations 60 engage the heat transfer bar 50, and the second undulations 62 engage the IC chips 40. It should be understood that the multiple undulations may engage each chip, or a single undulation may be sufficient to provide the desired heat transfer. One example type of contact spring is described in U.S. Pat. No. 8,465,008, which is incorporated herein by reference in its entirety. Additionally, a single spring may be used to engage multiple chips, if desired, as illustrated in FIG. 6.

Figure 7:
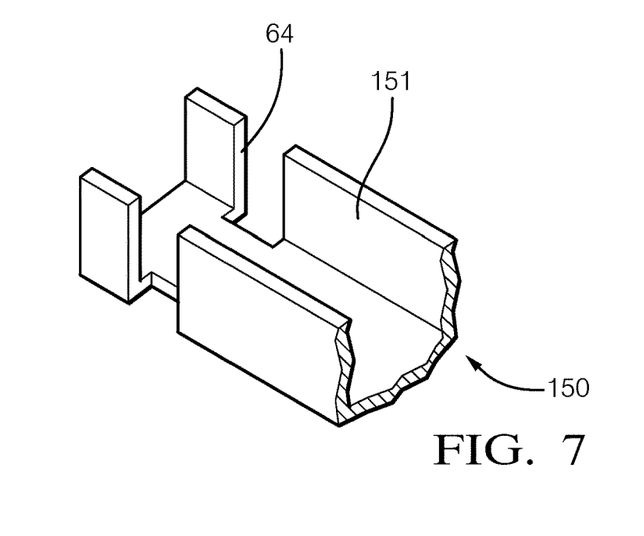
FIG. 7 is a partial perspective view of an example heat transfer bar.
Figure 8A:
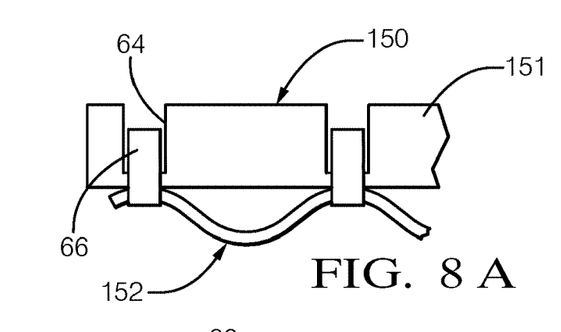
FIGS. 8A and 8B respectively are side elevation and top elevation views of the heat transfer bar shown in FIG. 7 with a supported spring.
Figure 8B:
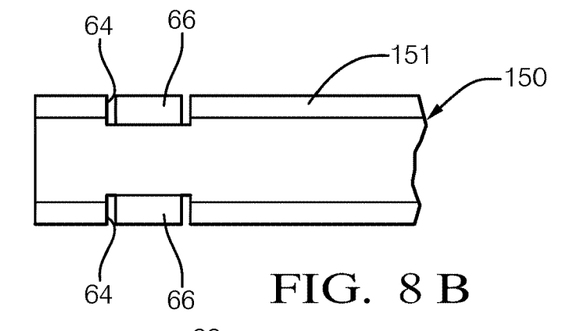
Figure 9:
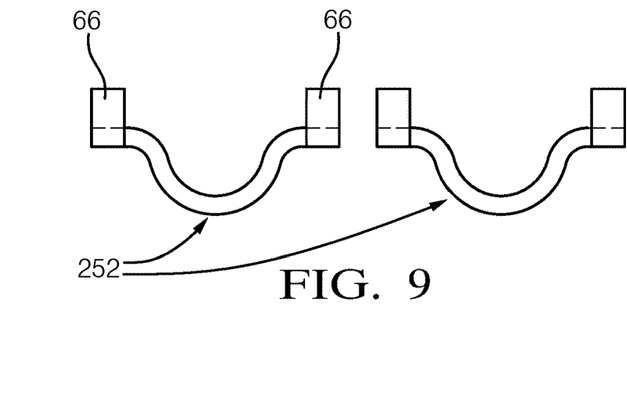
FIG. 9 is a side elevation view of multiple, discrete springs for use with a heat transfer bar similar to that shown in FIG. 7.

To simplify the support of the spring with respect to the radome 42, the heat transfer bar 150, as shown in FIG. 7, may include notches 64 that receive tabs 66 of the spring 152, as illustrated in FIGS. 8A-8B. Discrete springs 252 may be provided, as illustrated in FIG. 9.

Figure 10:
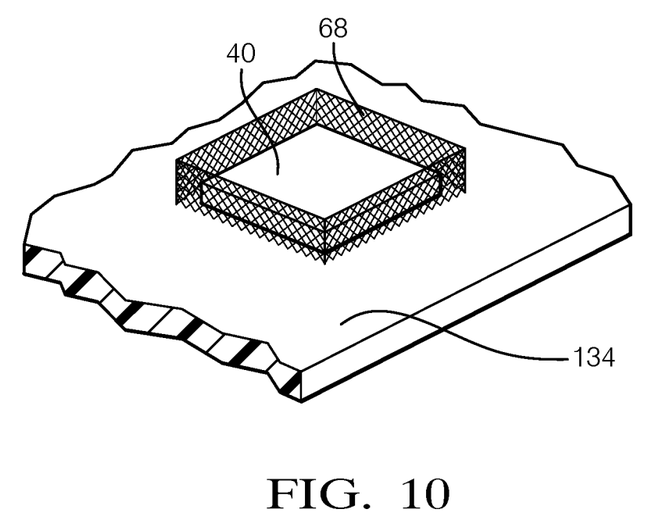
FIG. 10 is a perspective view of an electromagnetic interference (EMI) shield arranged about the IC chip and mounted on a printed circuit board (PCB).
Figure 11:
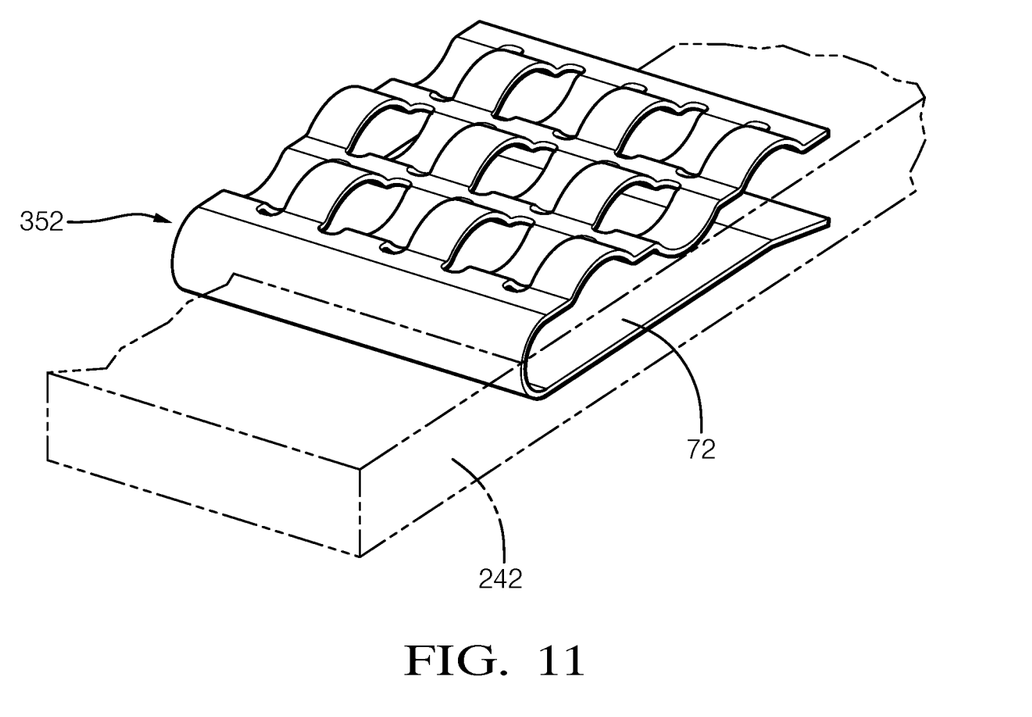
FIG. 11 is a perspective view of an example spring imbedded within a radome.
Figure 12:
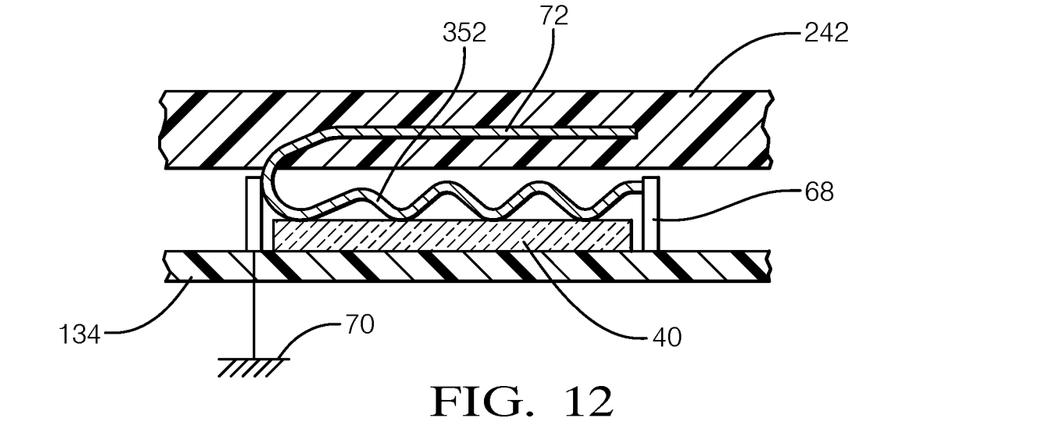
FIG. 12 is a cross-sectional view of the spring engaging the EMI shield shown in FIG. 10 and the IC chip.

The stamped metallic springs may also provide electromagnetic interference (EMI) isolation between neighboring MMICs and can be electrically interfaced to a ground of the PCB. Protection against EMI may be provided for the IC chips 40, as schematically illustrated in FIGS. 10-12. An electromagnetic shield 68 is mounted to the printed circuit board 134 and electrically connected to a ground 70. A spring 352 engaging the radome 242 is an electrical contact with the electromagnetic shield 68 and in thermal engagement with the chip 40. The spring 352 may include a clip 72 embedded within the radome 242 to eliminate the separate components of the heat sink and the heat transfer bar, if desired.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A radar unit comprising:
   a printed circuit board (PCB) supporting an integrated circuit (IC) chip;
   a radome arranged over the IC chip; and
   a spring engaging the IC chip and the radome, the spring configured to transfer thermal energy between the IC chip and the radome.

2. The radar unit of claim 1, wherein the IC chip is a monolithic microwave integrated circuit (MMIC).

3. The radar unit of claim 1, wherein the radome is constructed from a plastic material, and the spring is constructed from a corrugated metallic material having flexible undulations.

4. The radar unit of claim 1, wherein the radome includes a metallic heat transfer bar, the spring engaging the heat transfer bar.

5. The radar unit of claim 4, wherein the heat transfer bar is provided by a metallic plating deposited onto the plastic material.

6. The radar unit of claim 4, wherein the radome includes a slot that receives the heat transfer bar.

7. The radar unit of claim 6, wherein the heat transfer bar includes a notch, and the spring has a tab that is received in the slot and within the notch.

8. The radar unit of claim 1, wherein an electromagnetic interference (EMI) shield is mounted to the PCB about the IC chip, and the spring engages the EMI shield.

9. The radar unit of claim 1, comprising a plastic housing arranged about the PCB, and the radome is provided by the plastic housing.

10. The radar unit of claim 9, wherein the housing includes cooling fins.

11. The radar unit of claim 1, comprising a metallic housing arranged about the PCB, and the housing includes an aperture, and the radome is overmolded within the aperture.

12. The radar unit of claim 1, wherein the PCB includes a row of IC chips, and a common spring engages each of the IC chips within the row.

13. The radar unit of claim 1, wherein the chip has a face, and the spring engages the face.

14. A method of manufacturing a radar unit comprising the steps of:
   securing a printed circuit board (PCB) having an integrated circuit (IC) chip with a face to a housing portion;
   mounting a spring to a radome; and
   securing the radome relative to the housing portion to engage the face of the IC chip with the spring.

15. The method of claim 14, wherein the radome includes a heat transfer bar, and the mounting step includes engaging the spring with the heat transfer bar.

16. A method of manufacturing a radar unit comprising the steps of:
   securing a printed circuit board (PCB) having an integrated circuit (IC) chip to a housing portion;
   mounting a spring to a radome; and
   securing the radome relative to the housing portion to engage the IC chip with the spring, comprising the step of depositing the heat transfer bar onto a radome substrate.

17. A method of manufacturing a radar unit comprising the steps of:
   securing a printed circuit board (PCB) having an integrated circuit (IC) chip to a housing portion;
   mounting a spring to a radome; and
   securing the radome relative to the housing portion to engage the IC chip with the spring, comprising the step of inserting the heat transfer bar into a slot in a radome substrate.

18. A method of manufacturing a radar unit comprising the steps of:
   securing a printed circuit board (PCB) having an integrated circuit (IC) chip to a housing portion;
   mounting a spring to a radome; and securing the radome relative to the housing portion to engage the IC chip with the spring, comprising the step of inserting a tab of the spring into a notch in the heat transfer bar.

19. A radar unit comprising:
a radar generating unit for emitting microwaves;
a radome arranged over the radar generating unit, wherein the radar generating unit is a monolithic microwave integrated circuit (MMIC) chip having a heat-generating front face; and
a heat transfer stack for transferring thermal energy between the radar generating unit and the radome, the heat transfer stack engaging the radome and the front face.

20. The radar unit of claim 19, the radome is constructed from a plastic material, and the heat transfer stack is a spring constructed from a corrugated metallic material.

21. A radar unit comprising:
a radar generating unit for emitting microwaves;
a radome arranged over the radar generating unit;
a heat transfer stack for transferring thermal energy between the radar generating unit and the radome, the heat transfer stack engaging the radome and the radar generating unit; and
a shielding device for minimizing electromagnetic interference with the radar generating unit, the heat transfer stack engaging the shielding device.

* * * * *